United States Patent [19]

Klatt

[11] Patent Number: 4,548,079

[45] Date of Patent: Oct. 22, 1985

[54] METHOD AND APPARATUS TO AUTOMATICALLY DETERMINE THE WEIGHT OR MASS OF A MOVING VEHICLE

[75] Inventor: Alfred Klatt, Wathlingen, Fed. Rep. of Germany

[73] Assignee: WABCO Westinghouse Fahrzeugbremsen GmbH, Hannover, Fed. Rep. of Germany

[21] Appl. No.: 557,789

[22] Filed: Dec. 5, 1983

[30] Foreign Application Priority Data

Dec. 14, 1982 [DE] Fed. Rep. of Germany ....... 3246201

[51] Int. Cl.$^4$ ............................................. G01G 9/00
[52] U.S. Cl. .................................... 73/432 R; 73/495; 73/862.19; 73/862.28; 364/424; 364/424.1; 364/426
[58] Field of Search ..................... 73/432 R, 495, 509, 73/510, 862.08, 862.19, 862.28; 364/424, 424.1, 426

[56] References Cited

U.S. PATENT DOCUMENTS 4,312,249 1/1982 Hau ..................................... 364/426

Primary Examiner—S. Clement Swisher
Attorney, Agent, or Firm—J. O. Ray, Jr.

[57] ABSTRACT

This invention teaches a method and apparatus for the determination of the weight of a moving vehicle driven by an internal combustion engine. The invention provides means for the determination of a value corresponding to the driving torque of the engine, and for the determination of an acceleration value corresponding to the acceleration of the vehicle. The measuring means are controlled in such a manner that the torque value can be determined at the same time as the acceleration value. Furthermore, a calculating device is provided in which one or two values of the driving torque value—determined at different times—as well as values of the acceleration variable—determined at said times—are utilized for the determination of a weight variable corresponding with the weight of the vehicle.

31 Claims, 1 Drawing Figure

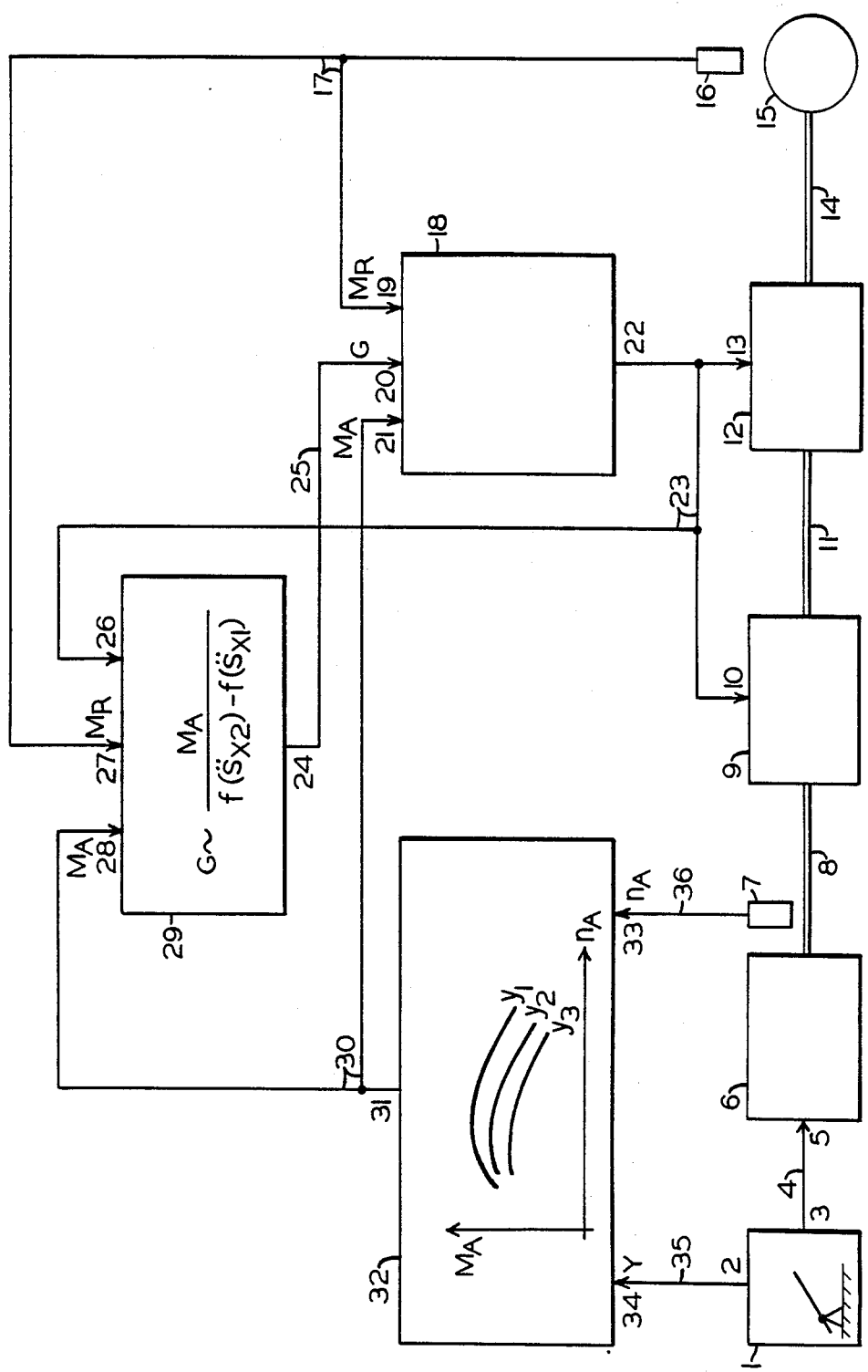

METHOD AND APPARATUS TO AUTOMATICALLY DETERMINE THE WEIGHT OR MASS OF A MOVING VEHICLE

BACKGROUND OF THE INVENTION

This invention relates in general to vehicle weight or mass and, more particularly, to a method and apparatus for the automatic determination of the weight or mass of a moving vehicle.

The determination of the weight with regard to motor vehicles is of significance for a number of reasons. For example, it is important if the vehicle is driven by an internal combustion engine that is equipped with a transmission having staged gears. For proper gear changing control, a number of predetermined selection-criteria switching signals need to be generated. One selection-criteria being the weight or mass of the vehicle.

Prior to this invention, starting values corresponding with the starting torque of the combustion engine, and acceleration values corresponding with the acceleration of the vehicle, have been processed in an automatic calculating device. Also, other additional and desirable vehicle characteristic values regarding the operating condition of the vehicle for the purpose of determining the aforementioned switching signals have been processed in the calculating device setup. Furthermore, by way of a manually adjustable switch, normally in three stages, the calculating device setup is given additional essential information concerning the load condition of the vehicle as estimated by the driver.

The determination of the weight of a motor vehicle driven by an internal combustion engine, or a weight value corresponding with this weight is also necessary, for example, with an automatic load-dependent brake system. With such a system, the weight of the vehicle that is to be slowed down, or stopped, may be taken into consideration for proper brake application. Prior to this invention, for a reliable and accurate weight determination of the vehicle, one had to weigh the vehicle on a scale and transmit the thus determined weight to the setting member of the load-dependent brake system. Automatic load-dependent brake-force regulators, however, generally work with a lever mechanism which is logically arranged between the structure of the vehicle and an axle of the same, and is actuated in relationship to the load of the vehicle. Furthermore, if the vehicle is a truck, for example, the weight may change many times during the day due to loading and unloading of the truck contents. Therefore, in most cases, weighing the vehicle on a scale is not practical. In addition, the prior art devices for the automatic determination of the weight of a vehicle are either complicated or comparably expensive and inaccurate.

SUMMARY OF THE INVENTION

The instant invention discloses a method and apparatus for determining the weight or mass of a moving vehicle. According to the invention, a signal is generated which represents a value corresponding to the weight of the moving vehicle. The signal generated is useful in a number of different operating functions of the vehicle. In carrying out the invention, a first signal is generated that corresponds to the torque of the engine of the moving vehicle. A second signal is also generated that corresponds to the acceleration of the vehicle at preselected times. At least one of the first signals and at least two of the second signals are used in a calculating device to calculate a value that corresponds to the weight of the vehicle. The calculating device then generates a signal representing this weight for use in preselected operating functions of the vehicle.

OBJECTS OF THE INVENTION

It is a primary object of the present invention to provide a method and apparatus for the automatic generation of a signal representing the weight or mass of a vehicle that is useful in a number of operating functions of a vehicle.

Another object of the invention is to provide a method and apparatus for the automatic generation of a signal representing the weight of a vehicle that does not require actual weighing of the vehicle on a scale.

Still another object of the invention is to provide a method and apparatus for the automatic generation of a signal representing the weight of a vehicle that eliminates the moment of resistance of rolling-friction, street-grade, and drag on the vehicle from the calculation of the weight.

Yet another object of the invention is to provide a method and apparatus for the automatic generation of a signal representing the weight of a vehicle that allows use of a predetermined weight value until a driving period has been established that is long enough to allow calculation of an accurate vehicle weight value.

These and various other objects and advantages of the invention will become more apparent to those persons skilled in the art from the following detailed description when taken in conjunction with the attached drawing.

BRIEF DESCRIPTION OF THE DRAWING

The single FIGURE is a schematic diagram showing the essential elements of a presently preferred embodiment of the instant invention.

BRIEF DESCRIPTION OF THE PREFERRED AND ALTERNATIVE EMBODIMENTS

The invention is predicated on the realization that the starting torque given off at any time $t_x$ by an engine can be represented as the second derivative equation as follows:

$$M_{Ax} \approx G \cdot f(\ddot{S}_x) + W_{Rx} + W_{Stx} + W_{Lx}. \quad (1)$$

In this equation (1):
$M_{Ax}$—starting torque
G—weight or mass of the vehicle
$S_x$—acceleration of the vehicle
$W_{Rx}$—moment of resistance of the rolling-friction
$W_{Stx}$—moment of resistance of the street-grade
$W_{Lx}$—moment of resistance of the drag.

In equation (1) for simplification, the effect of the rotating mass of the vehicle was disregarded; for example, the transmission, engine, and springs.

Further, for a specific point of time $t_{x1}$, the following equation for the starting torque given off by the engine can be represented as follows:

$$M_{Ax1} \approx G \cdot f(\ddot{S}_{x1}) + W_{Rx1} + W_{Stx1} + W_{Lx1}. \quad (2)$$

If one now deducts equation (1) and (2) from each other and formulates a new equation to solve for a value G, one obtains the following equation:

$$G \approx \frac{M_{Ax} - M_{Ax1}}{f(\ddot{S}_x) - f(\ddot{S}_{x1})} \quad (3)$$

This equation assumes that the sum of the moments of resistance at the instances $t_x$ and $t_{x1}$ is equal or nearly equal. This means that both of the moments, or instances $t_x$ and $t_{x1}$, follow in short succession or that, based on other circumstances, in each case equal or nearly equal values result at the instances $t_x$ and $t_{x1}$ for the gradient of the road and the speed of the vehicle.

For practical evaluation, equation (3) means that a sufficient differential of the starting driving torques must be determined to be able to calculate a usable value for the weight G of the vehicle.

It has been found to be an advantage to make certain that th vehicle at the instance $t_{x1}$ is in a power-off condition, that is, in a condition whereby the driving torque of the driving engine equals zero, so that for the determination of the weight G of the vehicle, only a single value of the driving torque needs to be taken into consideration.

A presently preferred way to achieve the power-off condition indicated, is to ensure that a clutch within the drive-train of the vehicle is disengaged. It is further possible, for the purpose of achieving the power-off condition, to drive the vehicle in such a manner that a driving condition results which is practically without hesitation on acceleration.

The invention will now be explained in more detail by way of an operating example which is represented in the drawing.

The drawing shows a simplified representation of the essential elements of a vehicle which is driven by an internal combustion engine 6. The internal combustion engine 6 serves as the driving torque, having its fuel supply controllable by means of a fuel supply means 1. Via a shaft 8, the engine 6 is connected with a clutch 9 which, in turn, via a shaft 11, is connected with a transmission 12. The transmission 12 serves the purpose of driving an axle 14 which, in turn, drives the driven wheels of the vehicle. For the purpose of simplification of the driven wheels of the vehicle, only wheel 15 is represented.

The fuel supply means 1, for the control of the fuel supply of the engine 6, has a fuel supply outlet 3 which is connected via a fuel line 4 with a fuel inlet 5 of the engine 6. The fuel supply means 1 further includes a means which shows the position of the fuel supply means 1 as a command rate Y. The use of command rate Y will be explained hereinafter.

In the easiest case, the fuel supply means 1, used as the control element for the fuel supply of engine 6, contains a customary, mechanically working gas pedal. However, as an alternative, the fuel supply means 1 can also be designed as an electric or electronic fuel supply source (not shown) if the engine 6 is controllable by means of a control signal. Finally, the fuel supply means 1 can also be designed as a pump actuation rod (not shown) of a diesel engine which directly controls the fuel supply.

The clutch 9, arranged between the shaft 8 on the driving side and shaft 11 on the driven side, can be actuated by means of a control impulse which is supplied via a signal line 23 and a signal inlet 10.

The transmission 12 can also be controlled electrically whereby signal inlets 13 of the transmission 12 serve the purpose of receiving respective control impulses for the engaging of the desired or required gear. The clutch 9 as well as the transmission 12, in the most simplified case, can also be actuated by purely mechanical means. In this case, signal inlets 10 and 13 symbolically represent the connection between the clutch 9 and the respective actuating or tripping mechanism (not shown), as well as the transmission 12 and its respective shifting mechanism (not shown).

In the presently preferred practice of this invention, for control of transmission 12, a transmission control means 18 is provided. In the most simplified case, this transmission control 18 works in such a way that the transmission is geared automatically in relationship to the speed of the vehicle and thus in relationship to the rotational speed $n_R$ of the driven wheel 15. In addition, in the transmission control 18, the weight G of the vehicle or a weight-value corresponding with this weight G, as well as the respective starting torque $M_A$ of the engine 6, are taken into consideration. To determine the rotational speed $n_R$ of the driven wheel 15, an impulse transmitter 16 is provided, whereby its rotational speed signal is guided via a signal line 17 to a signal inlet 19 of the transmission control 18. The aforementioned weight-value G is transmitted to the transmission control 18 via a signal line 25, whereas the respective starting torque $M_A$, or a driving value corresponding with this driving torque, is fed to the transmission control 18 via a signal inlet 21.

Via signal outlet 22 and corresponding signal lines 23, the transmission control 18 is connected with the signal inlets 13 of the transmission 12 and the signal inlet 10 of the clutch 9.

If, in the transmission control 18, a new gear is fixed in relationship to the speed of the vehicle and thus the rotational speedof the wheel 15, and under consideration of the predetermined selection-criteria (weight and driving torque of the vehicle), the clutch 9 is tripped via its signal inlet 10 and, subsequently, with the clutch separated, the transmission 12 is switched by the transmission control 18 via the signal inlets 13 of the transmission 12. After that, the clutch 9 is closed again. The control or actuation of the clutch 9 and the transmission 12, as indicated above, can also take place purely mechanically via servo motors (not shown) of the transmission control 18.

The signal inlet 20 of the transmission control 18 is connected via a signal line 25 with a signal outlet 24 of a microprocessor calculating and control system 29 for the determination of the weight G of the vehicle in which the microprocessor 29 is designed for both evaluation and control functions.

The signal inlet 21 of the transmission control 18, via a line 30, is connected to the signal outlet 31 of an engine-characteristics-accumulator or memory storage unit 32, which, at the aforementioned signal outlet 31, makes available a signal which corresponds with the momentary driving torque of the engine 6. The respective momentary driving torque $M_A$ of the engine 6 is determined in the unit 32 which has stored therein a predetermined plurality of a family of functions or curves (characteristics) having the relationship of the following values to each other: momentary driving torque $M_A$ of the engine 6, rotational speed $n_A$ of the engine 6, and position Y of the fuel supply means 1. In the operating example represented, the unit 32—for different values ($Y_1$, $Y_2$, $Y_3$) of the position Y of the fuel supply means 1—contains one function or curve each for the dependency of the momentary driving torque $M_A$ from the rotational speed $n_A$.

The position Y of the fuel supply means 1 is transmitted to a signal inlet 34 of the unit 32 via a signal line 35 which, in turn, is connected to the signal outlet 2 of the fuel supply means 1. The rotational speed $n_A$ of the engine 6 is determined by means of a sensor 7 which probes the shaft 8, and is fed to a signal inlet 33 of the unit 32 via a signal line 36. The unit 32 is designed in such a manner that it makes available the momentary driving torque $M_A$ at its signal outlet 31 for each value pair $Y/n_A$. The rotational speed $n_A$ of the engine 6 can also be computed from the rotational speed of the wheel $n_R$ with regard to wheel 15, if the respective transformation ratio of the transmission 12 is taken into consideration.

In the control system 29 for the determination of the weight G of the vehicle, the ratio between the momentary driving torque $M_A$ of the engine 6 and a differential of two operands is formed, whereby the aforementioned operands in each case contain an acceleration value corresponding with the acceleration of the vehicle. Both of these acceleration values $S_{x2}$ and $S_{x1}$ are determined at different instances, whereby one of the acceleration values is determined at one instance in which the vehicle is subjected to drive through the engine 6, and whereby the other accelertion value is determined at an instance in which the vehicle is in a power-off condition. In this power-off condition, the vehicle is neither in an accelerated condition or in a hesitation condition.

In order to be able to carry out the computing operation, as indicated, the control system 29 is supplied with the momentary driving torque $M_A$ of the engine 6. This takes place via the signal line 30 and a signal inlet 28. The time slope of the rotational speed $n_R$ of the driven wheel 15—necessary for the forming of the acceleration values $S_{x2}$ and $S_{x1}$—is transmitted to a signal inlet 27 of the control system 29. Finally, via the signal line 23, a signal inlet 26 of the control system 29 is informed of the moment in which the clutch 9 is disengaged through control signals or impulses of the transmission control 18. In this manner, a distinction can be made in the control system 29 between such times in which the vehicle is subjected to drive through engine 6, and those in which the vehicle is not subject to drive through engine 6. At these different instances, the acceleration values $S_{x2}$ and $S_{x1}$ are measured or determined, respectively. For this, a differentiating mechanism serves the single or double mathematical differentiation of the rotational speed $n_R$ with respect to the wheel 15.

The power-off condition of the vehicle, which, in the represented operating example is caused by the arrangement of the clutch 9, can also be reproduced by the fact that the closed clutch of the engine 6 is controlled in such a way that the vehicle is not subjected to hesitation or acceleration. Accordingly, one can also provide a mechanism within control 29 which is capable of recognizing such a condition of hesitation-free or acceleration-free drive with regard to the vehicle, and is able to carry out the respective measurement or computation of the characteristic value corresponding with the power-off condition precisely at that moment.

The control system 29 can also be designed in such a way that different determined weight-values G are utilized for the formulation of a mean value for the weight-values G, and that the thus obtained mean value of the weight-values G, in time, is utilized for the indication or determination of the weight G of the vehicle. In this case, the transmission control 18 is provided with a weight-mean value.

Also, means could be provided which only permit utilization of such weight-values G or only such mean values of the weight-values G that do not exceed a predetermined deviation from a predetermined value or a previously determined value of the weight-values G.

To make certain that even then, when in the control system 29, for example due to a driving period which is too brief, no sufficiently accurate value for the weight-value G is available, one is able to calculate in the transmission control 18 a usable value for the weight-value G, it is advantageous to use a medium weight-value $G_O$ which corresponds with a half-loaded vehicle, instead of the weight-value G determined by the control system 29.

The described determination of the weight-value G in the control system 29 can be changed in such a way that, instead of the selection of a measuring time or instance for the driving torque $M_A$ and the acceleration value S during the power-off condition of the vehicle, this particular measuring instance, as well as the second measuring instance, may be selected for the indicated values during the normal driven condition. In this case, in the control system 29, instead of one value for the driving torque $M_A$, a difference of two different driving torques is to be processed.

Valid for all cases described is, that the determination of the acceleration value can yield positive as well as negative measuring values of the acceleration.

If, for the determination of the weight G of the vehicle, two values of the driving torque $M_A$—determined at different points of time—are evaluated, one is able to advantageously provide an additional mechanism in which continuously or periodically in relatively short time intervals the value of the driving torque $M_A$ is determined.

Then, in case of the presence of a sufficiently great difference between the two values of the driving torque $M_A$ measured in sequence, the weight G can be determined. Such sufficiently diversified values of the driving torque $M_A$ can occur then, when the driver of the vehicle undertakes greater changes with regard to the position of the fuel supply means 1.

The weight G signal 25 from control means 29 can also be supplied to a brake system (not shown) or to a fuel calculation device (not shown) as additional inputs for more accurate operation of these devices.

While both the preferred and alternative embodiments have been shown and described for automatic determination of the weight or mass of a vehicle, it should be obvious that other modifications can be made without departing from the spirit and scope of the appended claims.

I claim:

1. A method of determining the weight of a moving vehicle and generating a signal which represents a value corresponding to said weight of said moving vehicle, said method comprising the steps of:
    (a) generating a first signal corresponding to the torque on the engine of said moving vehicle at a first point in time;
    (b) generating a second signal corresponding to said torque on said engine of said moving vehicle at a second point in time;

(c) genrating a first signal corresponding to the acceleration of said moving vehicle at said first point in time in step (a);

(d) generating a second signal corresponding to said acceleration of said moving vehicle at said second point in time in step (b);

(e) calculating a value representative of said weight of said moving vehicle from said signals generated in steps (a) through (d); and (f) generating a signal representating said value of said weight calculated in step (e).

2. A method, according to claim 1, wherein said method includes the additional step of transmitting said signal generated in step (f) to at least one operating mechanism of said moving vehicle.

3. A method, according to claim 2, wherein said signal generated in step (f) is transmitted to the transmission control mechanism of said vehicle.

4. A method, according to claim 2, wherein said signal generated in step (f) is transmitted to the braking system of said vehicle.

5. A method, according to claim 2, wherein said signal generated in step (f) is transmitted to a fuel calculation device of said vehicle.

6. A method, according to claim 4, wherein said method includes the additional step of calculating the fuel consumption of said moving vehicle in terms of miles per gallon.

7. A method, according to claim 6, wherein said fuel calculation step includes the additional step of calculating the number of miles that can be traveled by said moving vehicle with the remaining fuel under present driving conditions.

8. A method, according to claim 1, wherein steps (a) and (b) include the step of directly measuring said amount of torque of said engine.

9. A method, according to claim 1, wherein steps (a) and (b) include the steps of:

(a) generating a signal representing the rotational speed of said engine at a point in time;

(b) generating a signal representing the amount of fuel being fed to said engine at the same point in time said rotational speed signal is generated;

(c) comparing at least one signal representing said rotational speed of said engine and at least one signal representing said amount of fuel being fed to said engine at said same point in time as said at least one signal representing said rotational speed of said engine was generated with a predetermined plurality of curves representing said torque on said engine which are stored in a memory storage device, each of said plurality of curves having a unique torque value on said engine for a given amount of said fuel being fed to said engine and a corresponding rotational speed of said engine;

(d) determining from said predetermined plurality of curves said torque on said engine; and (e) transmitting a signal representing said torque on said engine from said memory storage device to a calculating means.

10. A method, according to claim 1, wherein said method includes the additional steps of:

(a) generating a signal to indicate when said engine of said moving vehicle is in a power-off condition;

(b) transmitting said signal which indicates said engine is in said power-off condition to a calculating means; and (c) using the second of said two signals corresponding to said acceleration value during the time when said engine is in a power-off condition in said calculation means.

11. A method, according to claim 10, wherein step (e) includes the step of solving the equation $$G \approx \frac{M_{ax} - M_{ax1}}{f(\ddot{S}_x) - f(\ddot{S}_{x1})}.$$

12. A method, according to claim 11, wherein said method includes the additional step of disengaging the clutch of said moving vehicle at a point in time when said signal is generated which indicates said power-off condition of said engine.

13. A method, according to claim 1, wherein said signals generated in steps (a) and (b) must have a predetermined differential in said torque on said engine for calculating said value representative of said weight of said moving vehicle in step (e).

14. A method, according to claim 2, wherein said signal transmitted to said at least one operating mechanism of said moving vehicle representing said value of said calculated weight of said moving vehicle is arrived at by a calculating means solving the equation $$G \approx \frac{M_{ax} - M_{ax1}}{f(\ddot{S}_x) - f(\ddot{S}_{x1})}.$$

15. A method, according to claim 1, wherein said signals in steps (c) and (d) are generated as impulse signals.

16. An apparatus to automatically determine the weight of a moving vehicle and to provide a signal that represents a value corresponding to said weight of said moving vehicle, said apparatus comprising:

(a) a first means positioned on said vehicle for providing a signal that corresponds to the torque on the engine of said moving vehicle;

(b) a second means positioned on said vehicle for providing a signal that corresponds to the acceleration of said moving vehicle; and (c) a calculating means positioned on said vehicle electrically connected to said first means to receive said signal that corresponds to said torque on said engine and electrically connected to said second means to receive said signal that corresponds to said acceleration of said moving vehicle, said calculating means calculating the weight of said moving vehicle from said signals and said calculating means generating said signal representing said value corresponding to said weight of said moving vehicle.

17. An apparatus to automatically determine the weight of a moving vehicle, according to claim 16, wherein said first means for providing a signal that corresponds to said torque on said engine comprises:

(a) a means for providing a signal corresponding to the rotational speed of said engine's drive shaft;

(b) a means for providing a signal corresponding to the amount of fuel being fed to said engine;

(c) means for storing a plurality of functions, each of said functions having a unique value representing said torque on said engine with respect to said rotational speed of said engine's drive shaft and said amount of fuel being fed to said engine, said means for storing said plurality of functions electrically connected to said means for providing said signal corresponding to said rotational speed of said engine's drive shaft and to said means for providing said signal corresponding to said amount of fuel being supplied to said engine; and (d) a means for comparing said functions with said signals positioned within said means for storing said plurality of functions and for providing said signal that corresponds to said torque on said engine to said calculating means.

18. An apparatus to automatically determine the weight of a moving vehicle, according to claim 17, wherein said means for providing said signal corresponding to said rotational speed of said engine's drive shaft is a sensor positioned to sense said rotational speed of said engine's drive shaft.

19. An apparatus to automatically determine the weight of a moving vehicle, according to claim 16, wherein said apparatus further includes a means connected at one end thereof to an output terminal of said calculating means and connected at the other end thereof to an input terminal of a transmission control mechanism of said vehicle for transmitting said signal corresponding to said weight of said vehicle from said calculating means to said transmission control mechanism of said vehicle.

20. An apparatus to automatically ddetermine the weight of a moving vehicle, according to claim 19, wherein said apparatus further comprises a means connected at one end thereof to an output terminal of said first means and connected at the other end thereof to an input terminal of said transmission control mechanism for electrically transmitting to said transmission control mechanism said signal from said first means corresponding to said torque on said engine of said moving vehicle.

21. An apparatus to automatically determine the weight of a moving vehicle, according to claim 19, wherein said apparatus further comprises a clutch connected on one side thereof to said engine's drive shaft and on the opposed side thereof to the transmission.

22. An apparatus to automatically determine the weight of a moving vehicle, according to claim 21, wherein said transmission control further comprises a means connected at one end thereof to an output terminal of said transmission control and connected at the other end thereof to an input terminal of said clutch for transmitting a signal to disengage said clutch.

23. An apparatus to automatically determine the weight of a moving vehicle, according to claim 22, wherein said apparatus further comprises a means connected at one end thereof to an input terminal of said calculating means and connected at the other end thereof to one of said output terminal of said transmission control mechanism and said means for transmitting said signal to disengage said clutch for transmitting said signal to disengage said clutch to said calculating means for enabling said calculating means to determine when said engine is in a power-off condition.

24. An apparatus to automatically determine the weight of a moving vehicle, according to claim 16, wherein said second means for providing a signal corresponding to said acceleration of said moving vehicle is a sensor positioned to sense the rotational speed of at least one wheel.

25. An apparatus to automatically determine the weight of a moving vehicle, according to claim 24, wherein said at least one wheel is a driven wheel.

26. An apparatus to automatically determine the weight of a moving vehicle, according to claim 16, wherein said apparatus further includes a means connected between said calculating means and a load-bearing brake control system for transmiting said signal corresponding to said weight of said vehicle to said load-bearing brake control system.

27. An apparatus to automatically determine the weight of a moving vehicle, according to claim 16, wherein said apparatus further comprises a means connected between said calculation means and a fuel calculation device for transmitting said signal corresponding to said weight of said vehicle to said fuel calculation device.

28. A method, according to claim 1, wherein said method includes the additional steps of transmitting said signals generated in steps (a) through (d) to a transmission control mechanism of said vehicle.

29. An apparatus to automatically determine the weight of a moving vehicle, according to claim 20, wherein said apparatus further comprises a means connected at one end thereof to an output terminal of said second means and connected at the other end thereof to an input terminal of said transmission control mechanism for electrically transmitting to said transmission control mechanism said signal from said second means corresponding to said acceleration of said moving vehicle.

30. An apparatus to automatically determine the weight of a moving vehicle, according to claim 16, wherein said calculating means further comprises a means positioned within said calculating means for formulating a mean value for said weight of said moving vehicle.

31. An apparatus to automatically determine the weight of a moving vehicle, according to claim 30, wherein said calculating means further comprises a means positioned within said calculating means for allowing generation of said signal having said value representative of said weight of said moving vehicle only when said value does not exceed a predetermined deviation from a predetermined value.

* * * * *

UNITED STATES PATENT AND TRADEMARK OFFICE
CERTIFICATE OF CORRECTION

PATENT NO. : 4,548,079
DATED : October 22, 1985
INVENTOR(S) : Alfred Klatt

It is certified that error appears in the above–identified patent and that said Letters Patent are hereby corrected as shown below:

Column 7, line 25, delete "4" and insert --5--

Signed and Sealed this

Twenty-fifth Day of February 1986

[SEAL]

Attest:

DONALD J. QUIGG

Attesting Officer          Commissioner of Patents and Trademarks